US012333730B2

(12) United States Patent
Xiong et al.

(10) Patent No.: US 12,333,730 B2
(45) Date of Patent: Jun. 17, 2025

(54) METHOD AND APPARATUS FOR SCENE SEGMENTATION FOR THREE-DIMENSIONAL SCENE RECONSTRUCTION

(71) Applicant: Samsung Electronics Co., Ltd., Suwon-si (KR)

(72) Inventors: Yingen Xiong, Mountain View, CA (US); Christopher A. Peri, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 405 days.

(21) Appl. No.: 17/805,828

(22) Filed: Jun. 7, 2022

(65) Prior Publication Data
US 2023/0092248 A1  Mar. 23, 2023

Related U.S. Application Data

(60) Provisional application No. 63/245,757, filed on Sep. 17, 2021.

(51) Int. Cl.
*G06T 7/00* (2017.01)
*G06T 7/11* (2017.01)
(Continued)

(52) U.S. Cl.
CPC .................. *G06T 7/11* (2017.01); *G06T 7/50* (2017.01); *G06V 10/25* (2022.01); *G06V 10/32* (2022.01);
(Continued)

(58) Field of Classification Search
CPC ... G06T 7/11; G06T 7/50; G06T 2207/20084; G06T 2207/30196; G06T 2207/10024;
(Continued)

(56) References Cited

U.S. PATENT DOCUMENTS 10,019,657 B2   7/2018   Lin et al.
11,494,937 B2*  11/2022  Urtasun ................ G01S 7/4802
(Continued)

FOREIGN PATENT DOCUMENTS

CN   107578436 A   1/2018
EP   3419286 A1   12/2018

OTHER PUBLICATIONS

Jaritz et al, Sparse and Dense Data with CNNs: Depth Completion and Semantic Segmentation, International Conference on 3D Vision (Year: 2018).*
(Continued)

*Primary Examiner* — Xiao Liu

(57) ABSTRACT

A method includes obtaining, from an image sensor, image data of a real-world scene; obtaining, from a depth sensor, sparse depth data of the real-world scene; and passing the image data to a first neural network to obtain one or more object regions of interest (ROIs) and one or more feature map ROIs. Each object ROI includes at least one detected object. The method also includes passing the image data and sparse depth data to a second neural network to obtain one or more dense depth map ROIs; aligning the one or more object ROIs, one or more feature map ROIs, and one or more dense depth map ROIs; and passing the aligned ROIs to a fully convolutional network to obtain a segmentation of the real-world scene. The segmentation contains one or more pixelwise predictions of one or more objects in the real-world scene.

20 Claims, 11 Drawing Sheets

(51) Int. Cl.
  *G06T 7/50* (2017.01)
  *G06V 10/25* (2022.01)
  *G06V 10/32* (2022.01)
  *G06V 10/764* (2022.01)
  *G06V 10/82* (2022.01)
  *G06V 20/20* (2022.01)

(52) U.S. Cl.
  CPC ............ *G06V 10/764* (2022.01); *G06V 10/82* (2022.01); *G06V 20/20* (2022.01); *G06T 2207/20084* (2013.01); *G06T 2207/30196* (2013.01)

(58) Field of Classification Search
  CPC .......... G06T 2207/10028; G06V 10/25; G06V 10/32; G06V 10/764; G06V 10/82; G06V 20/20; G06V 10/26; G06V 10/454; G06V 10/759; G06V 20/647
  See application file for complete search history.

(56) References Cited

U.S. PATENT DOCUMENTS

| | | | |
|---|---|---|---|
| 2019/0037150 | A1 | 1/2019 | Srikanth et al. |
| 2019/0147245 | A1 | 5/2019 | Qi et al. |
| 2020/0302612 | A1* | 9/2020 | Marrero ................... G06T 7/12 |
| 2021/0049397 | A1 | 2/2021 | Chen |
| 2021/0073997 | A1 | 3/2021 | Vora et al. |
| 2021/0142497 | A1 | 5/2021 | Pugh et al. |
| 2021/0150227 | A1* | 5/2021 | Hu ......................... G06V 20/64 |
| 2021/0150802 | A1 | 5/2021 | Varekamp et al. |
| 2021/0174513 | A1 | 6/2021 | Chidlovskii et al. |
| 2021/0174524 | A1 | 6/2021 | Wang et al. |
| 2021/0183083 | A1 | 6/2021 | Yan et al. |

OTHER PUBLICATIONS

Chen et al, Multi-View 3D Object Detection Network for Autonomous Driving, CVPR (Year: 2017).*
He et al, Mask R-CNN, ICCV (Year: 2017).*
Girshick et al, Fast R-CNN, ICCV (Year: 2015).*
Ma et al, Sparse-to-Dense: Depth Prediction from Sparse Depth Samples and a Single Image, IEEE International Conference on Robotics and Automation (ICRA), pp. 4796-4803 (Year: 2018).*
Long et al, Fully Convolutional Networks for Semantic Segmentation, CVPR, pp. 3431-3440 (Year: 2015).*
Lain et al, Deeper Depth Prediction with Fully Convolutional Residual Networks, IEEE International Conference on 3D Vision (3DV) (Year: 2016).*
Zhao et al, Pyramid Scene Parsing Network, CVPR, pp. 2881-2890 (Year: 2017).*
International Search Report and Written Opinion of the International Searching Authority dated Nov. 4, 2022 in connection with International Patent Application No. PCT/KR2022/011777, 10 pages.
Supplementary European Search Report dated Aug. 9, 2024 in connection with European Patent Application No. 22870147.0, 8 pages.

* cited by examiner

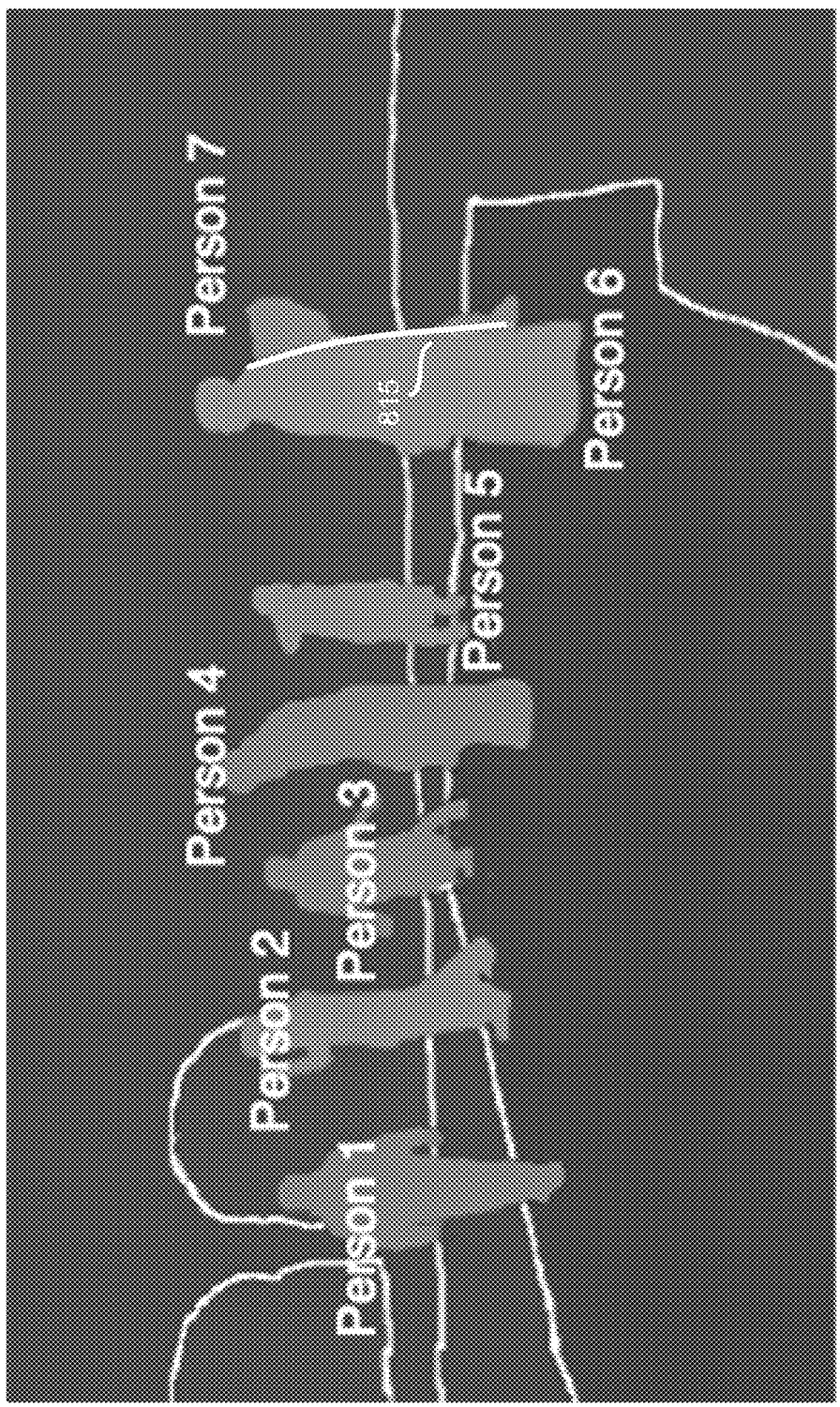

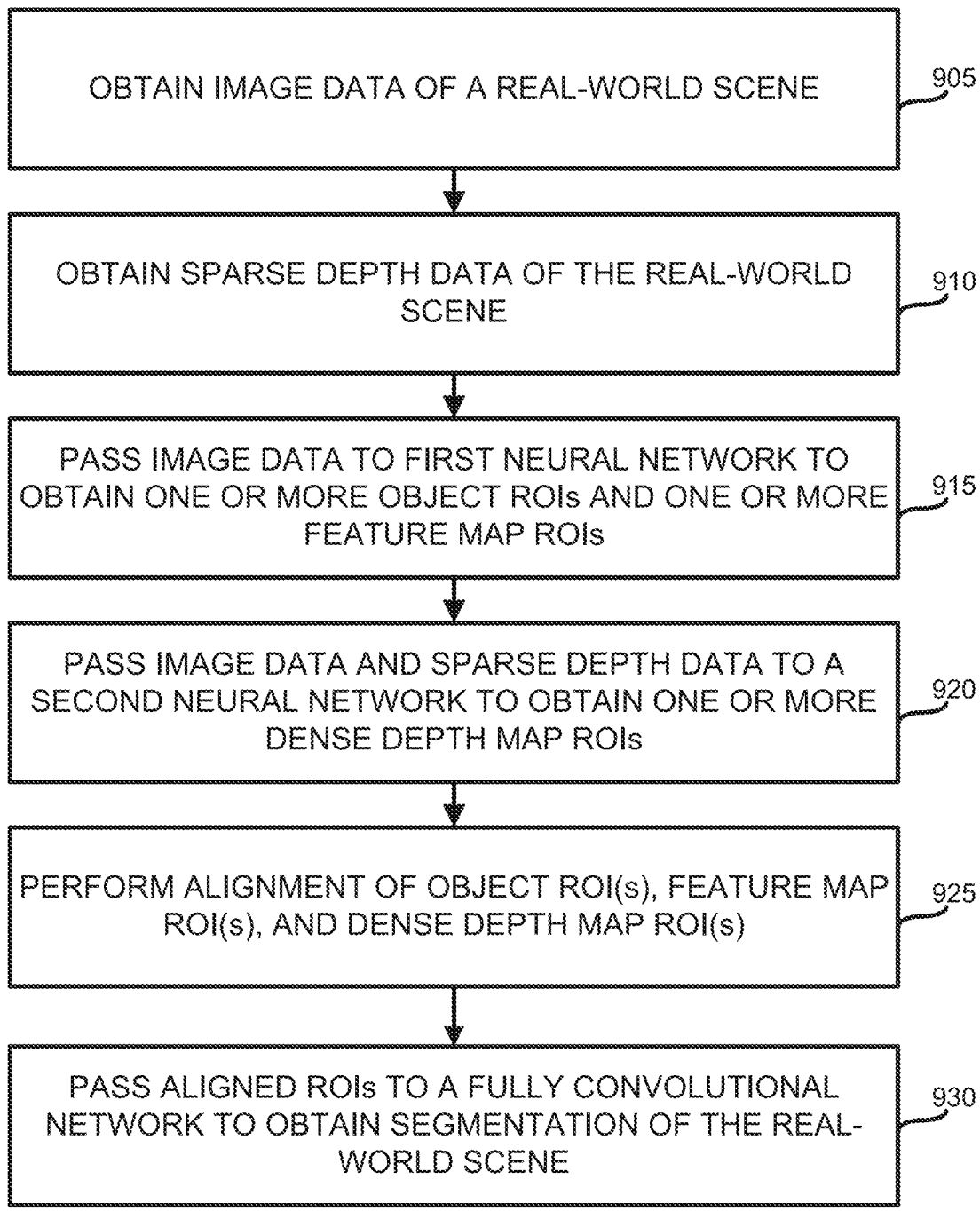

METHOD AND APPARATUS FOR SCENE SEGMENTATION FOR THREE-DIMENSIONAL SCENE RECONSTRUCTION

CROSS-REFERENCE TO RELATED APPLICATION AND CLAIM OF PRIORITY

This application claims priority under 35 U.S.C. § 119(e) to U.S. Provisional Patent Application No. 63/245,757 filed on Sep. 17, 2021. The above-identified provisional patent application is hereby incorporated by reference in its entirety.

TECHNICAL FIELD

This disclosure relates generally to computer vision and imaging systems. More specifically, this disclosure relates to a method and apparatus for scene segmentation for three-dimensional scene reconstruction.

BACKGROUND

Smartphones, tablets, and other readily portable, battery-powered devices have displaced or become peer devices to many users' notebooks or personal computers in the past two decades. Additionally, improvements in processor designs have also yielded processors and other chipsets that can provide users of such portable devices with augmented reality (AR) and/or extended reality (XR) displays. These devices provide displays that combine views of real-world operating environments (either as rendered displays or through transparent glasses) in combination with virtual objects that are rendered at locations and posed so that they appear to be positioned on real-world objects in users' views.

For many computer vision applications (including AR and XR displays) and imaging applications (including photography and image/video editing), obtaining a segmentation of a scene is necessary or helpful in performing the applications. However, scene segmentation, and in particular associating pixels of image data with categorized objects, typically entails the use of machine learning-based techniques, such as neural networks, and can be computationally expensive as a result. When implemented on battery-powered, portable computing platforms, the computational expense associated with traditional segmentation techniques can lead to degradation along other dimensions of system performance, such as battery life, frame rate, or latency or freezing of other applications executing at the computing platform.

SUMMARY

This disclosure provides a system and method for performing scene segmentation.

In a first embodiment, a method for obtaining scene segmentation includes obtaining, from an image sensor, image data of a real-world scene; obtaining, from a depth sensor, sparse depth data of the real-world scene; and passing the image data to a first neural network to obtain one or more object regions of interest (ROIs) and one or more feature map ROIs, where each object ROI includes at least one detected object. The method also includes passing the image data and the sparse depth data to a second neural network to obtain one or more dense depth map ROIs; aligning the one or more object ROIs, one or more feature map ROIs, and one or more dense depth map ROIs; and passing the aligned one or more object ROIs, one or more feature map ROIs, and one or more dense depth map ROIs to a fully convolutional network to obtain a segmentation of the real-world scene, where the segmentation contains one or more pixelwise predictions of one or more objects in the real-world scene.

In a second embodiment, an apparatus for obtaining scene segmentation includes an image sensor, a depth sensor, and at least one processing device. The at least one processing device is configured to obtain, from the image sensor, image data of a real-world scene; obtain, from the depth sensor, sparse depth data of the real-world scene; and pass the image data to a first neural network to obtain one or more object ROIs and one or more feature map ROIs, where each object ROI includes at least one detected object. The at least one processing device is also configured to pass the image data and the sparse depth data to a second neural network to obtain one or more dense depth map ROIs; align the one or more object ROIs, one or more feature map ROIs, and one or more dense depth map ROIs; and pass the aligned one or more object ROIs, one or more feature map ROIs, and one or more dense depth map ROIs to a fully convolutional network to obtain a segmentation of the real-world scene, where the segmentation contains one or more pixelwise predictions of one or more objects in the real-world scene.

In a third embodiment, a non-transitory computer-readable medium contains instructions that, when executed by at least one processor of an apparatus including an image sensor and a depth sensor, cause the apparatus to obtain, from the image sensor, image data of a real-world scene; obtain, from the depth sensor, sparse depth data of the real-world scene; and pass the image data to a first neural network to obtain one or more object ROIs and one or more feature map ROIs, where each object ROI includes at least one detected object. The medium also contains instructions that, when executed by the at least one processor, cause the apparatus to pass the image data and the sparse depth data to a second neural network to obtain one or more dense depth map ROIs; align the one or more object ROIs, one or more feature map ROIs, and one or more dense depth map ROIs; and pass the aligned one or more object ROIs, one or more feature map ROIs, and one or more dense depth map ROIs to a fully convolutional network to obtain a segmentation of the real-world scene, where the segmentation contains one or more pixelwise predictions of one or more objects in the real-world scene.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory, random access memory, a hard disk drive, a compact disc, a digital video disc, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIGS. 8A-8C illustrate examples of object detection and segmentation according to some embodiments of this disclosure; and FIG. 9 illustrates an example of a method for performing segmentation according to some embodiments of this disclosure.

DETAILED DESCRIPTION

FIGS. 1 through 9, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
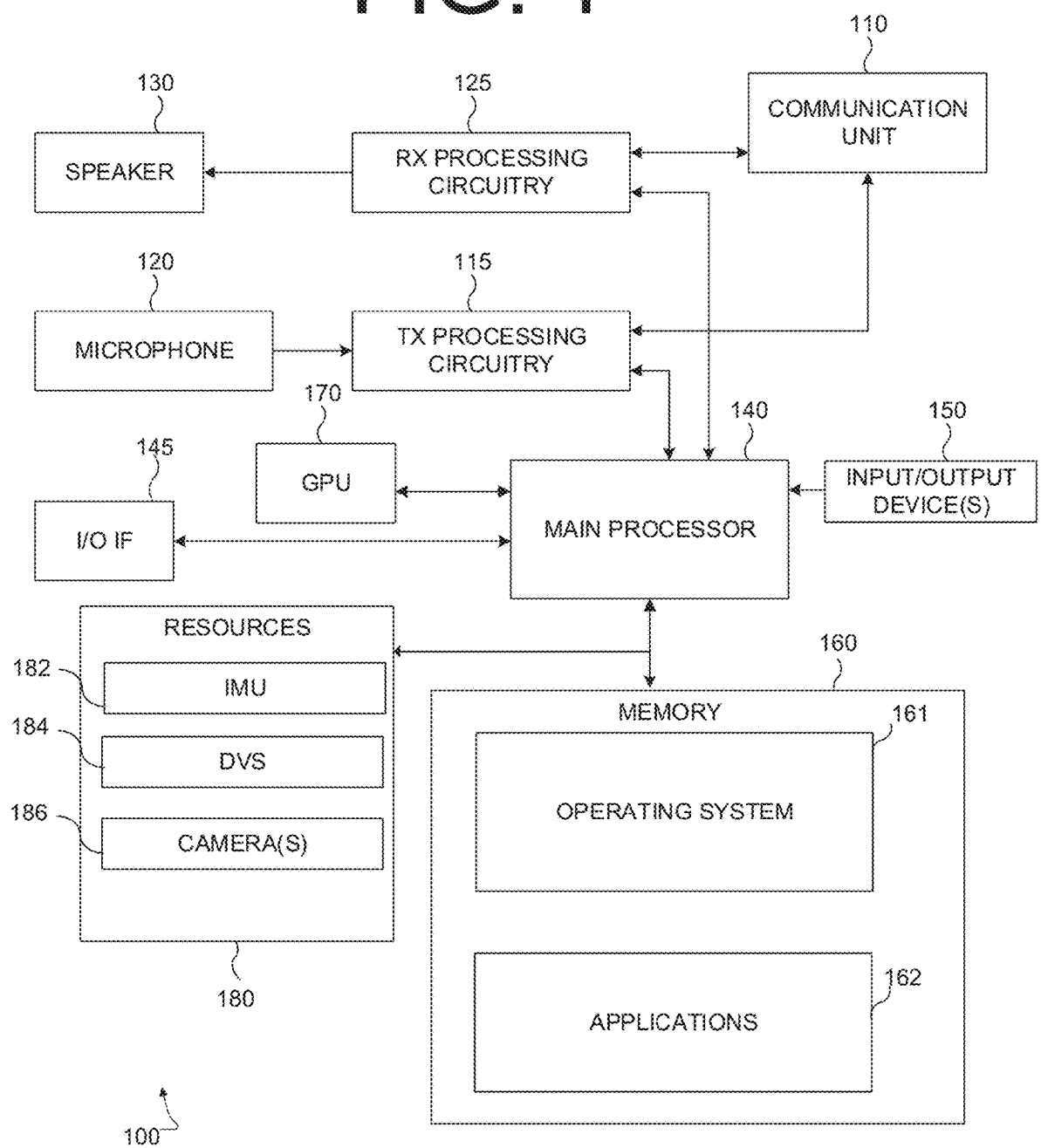
FIG. 1 illustrates an example of an electronic device for performing scene segmentation according to some embodiments of this disclosure.

FIG. 1 illustrates a non-limiting example of a device 100 operating as a processing platform for performing scene segmentation according to some embodiments of this disclosure. Scene segmentation may include identifying, at a pixel level, one or more regions within a frame of image data that correspond to one or more recognized objects. Examples of scene segmentation include, without limitation, semantic segmentation, instance segmentation, and panoptic segmentation. During semantic segmentation, one or more regions of pixels within an image frame are associated with one or more object classifications (such as a person), but individual instances of recognized objects are not specifically defined. During instance segmentation, pixels of one or more specific instances of one or more recognized objects are defined. During panoptic segmentation, an integration of multiple instance segmentation can be performed such that different regions of pixels of an entire image frame are associated with different instances of one or more recognized objects (such as each person in a scene). In some embodiments, the components described with reference to FIG. 1 are components of an AR or XR headset. In other embodiments, the components described with reference to FIG. 1 are components of an accessory device (such as a smartphone) communicatively connected to an AR or XR headset. The embodiment of the device 100 shown in FIG. 1 is for illustration only, and other configurations are possible. Suitable devices come in a wide variety of configurations, and FIG. 1 does not limit the scope of this disclosure to any particular implementation of a device.

As shown in the non-limiting example of FIG. 1, the device 100 includes a communication unit 110 that may include, for example, a radio frequency (RF) transceiver, a BLUETOOTH transceiver, or a WI-FI transceiver, etc. The device 100 also includes transmit (TX) processing circuitry 115, a microphone 120, and receive (RX) processing circuitry 125. The device 100 further includes a speaker 130, a main processor 140, an input/output (I/O) interface (IF) 145, I/O device(s) 150, and a memory 160. The memory 160 includes an operating system (OS) program 161 and one or more applications 162.

Applications 162 can include games, social media applications, applications for geotagging photographs and other items of digital content, virtual reality (VR) applications, augmented reality (AR) applications, extended reality (XR) applications, operating systems, device security (such as anti-theft and device tracking) applications, or any other applications that access resources of the device 100. The resources of the device 100 may include, without limitation, the speaker 130, microphone 120, I/O devices 150, and additional resources 180. According to some embodiments, applications 162 include XR applications that can project, on a display device, an XR display that combines elements of a view of a real-world operating environment of the device 100 in combination with one or more virtual objects, where each virtual object's position or dynamics embody a physical interaction (such as appearing to sit on a real-world table or bouncing off of a wall of a room) with a physical object of the real-world operating environment.

The communication unit 110 may receive an incoming RF signal, such as a near field communication signal like a BLUETOOTH or WI-FI signal. The communication unit 110 can down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data). Additionally, the communication unit 110 may contain a network interface, such as a network card, or a network interface implemented through software.

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or applications 162. Applications 162 can include applications specifically developed for the platform of device 100 or legacy applications developed for earlier platforms. Additionally, the main processor 140 can be manufactured to include program logic for implementing techniques for monitoring suspicious application access according to some embodiments of this disclosure. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the I/O device(s) 150. The operator of the device 100 can use the I/O device(s) 150 to enter data into the device 100. The I/O device(s) 150 can include a keyboard, HMD, touchscreen, mouse, track ball, or other device(s) capable of acting as a user interface to allow a user to interact with the device 100. In some embodiments, the I/O device(s) 150 can include a touch panel, a (digital) pen sensor, a key, or an ultrasonic input device.

The I/O device(s) 150 can include one or more screens, which can be a liquid crystal display, a light-emitting diode (LED) display, an optical LED (OLED), an active-matrix OLED (AMOLED), or other screen(s) capable of rendering graphics. In some embodiments, the I/O devices 150 include one or more devices (such as in an HMD) that project items of AR or XR content upon a clear lens.

The memory 160 is coupled to the main processor 140. According to some embodiments, part of the memory 160 includes a random-access memory (RAM), and another part of the memory 160 includes a Flash memory or other read-only memory (ROM).

According to some embodiments, the device 100 can further include a separate graphics processing unit (GPU) 170.

Also, according to some embodiments, the device 100 may further include a variety of additional resources 180 that can, if permitted, be accessed by the applications 162. According to particular embodiments, the additional resources 180 may include an accelerometer or inertial motion unit 182, which can detect movements of the device 100 along one or more degrees of freedom. As another example, according to particular embodiments, the additional resources 180 may include a dynamic vision sensor (DVS) 184 or one or more cameras 186.

Although FIG. 1 illustrates one example of a device 100 which can operate as a processing platform for scene segmentation according to some embodiments of this disclosure, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
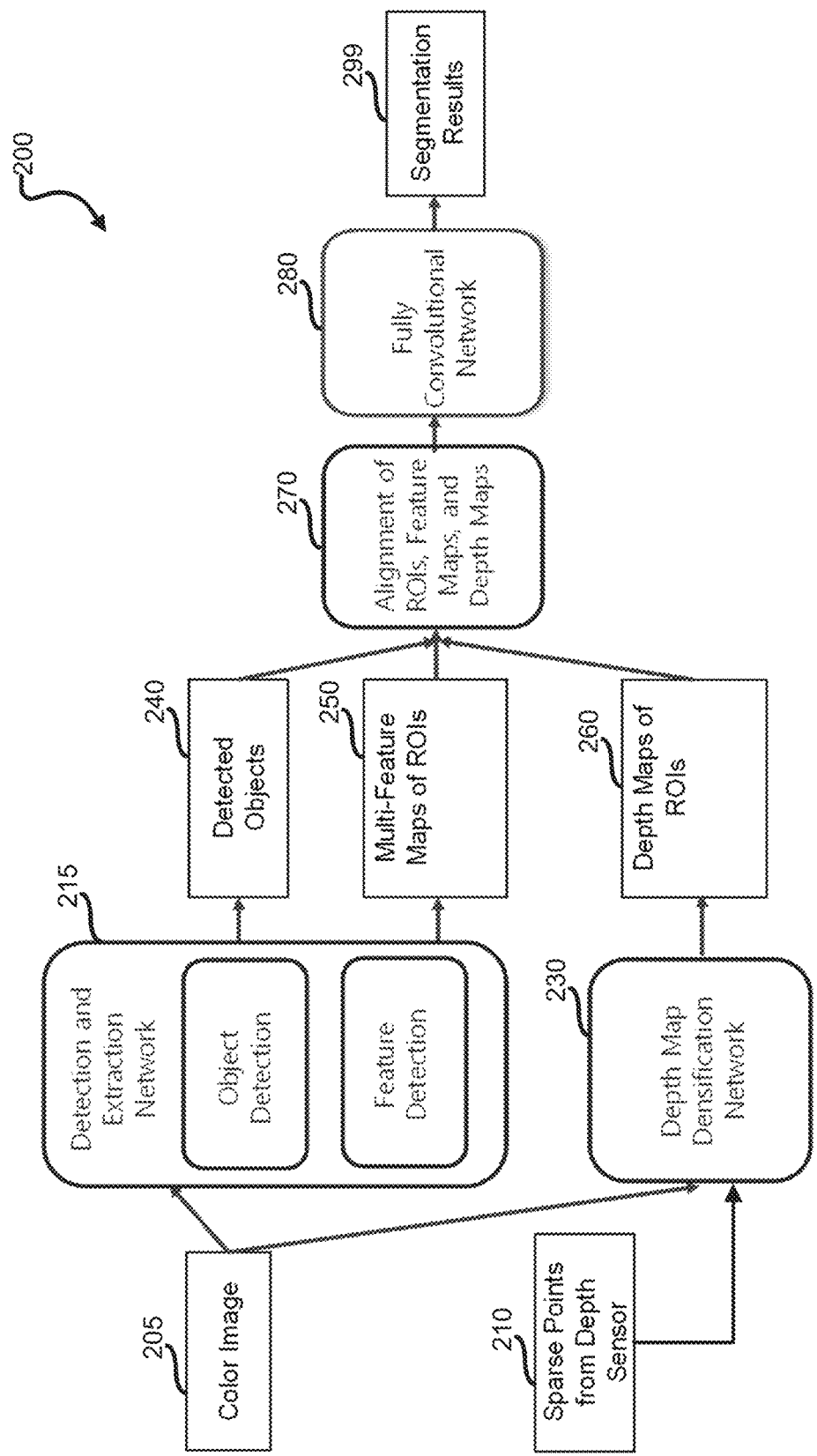
FIG. 2 illustrates an example of an architecture for performing scene segmentation according to some embodiments of this disclosure.

FIG. 2 illustrates an example of an architecture 200 for performing scene segmentation according to some embodiments of this disclosure. The operations described with reference to FIG. 2 may be performed at any suitably configured processing platform, such as the device 100 in FIG. 1.

Referring to the illustrative example of FIG. 2, the architecture 200 receives, as inputs, one or more frames of image data 205 and sparse depth map data 210 and outputs segmentation results 299. According to various embodiments, the segmentation results 299 may include one or more masks defining one or more regions of an image frame as corresponding to one or more specific instances of one or more classified objects. FIGS. 8B and 8C of this disclosure provide a non-limiting set of visual examples of segmentation results. The segmentation results 299 may be used for one or multiple applications like scene reconstruction (such as when knowing that a region contains an object belonging to the class "table" may assist in identifying its planes and three-dimensional features), or photo and video editing (such as when identifying artifacts or unwanted objects to be removed from an image).

According to some embodiments, the image data 205 includes one or more image frames captured by at least one visual sensor (such as a CMOS sensor in a digital camera) or the collected output of a dynamic vision sensor (DVS) over a specified interval. An image frame may include a raster or array of image data points that associate coordinate values with values of a color space (such as an RGB or CMYK color space). The sparse depth map data 210 include a collection of depth measurements obtained from a field of view of a depth sensor that overlaps the field of view of the camera used to obtain the image data 205. In some embodiments, the depth sensor may be a time of flight (ToF) sensor or a sensor that projects a pattern of structured light onto a scene and infers depth values from the distortion of the pattern as projected upon surfaces of the scene at different depths. In some embodiments, the sparse depth map data 210 may be obtained using a stereoscopic camera pair, where depth points can be calculated from projection differences of matched points in the images output from the cameras of the stereoscopic pair.

As shown in FIG. 2, the image data 205 is passed to a detection and extraction network 215, which in some embodiments may be a neural network. In contrast to conventional approaches where object detection and feature mapping are performed by two separate networks, the detection and extraction network 215 may output both one or more detected objects 240 and one or more feature maps 250 of one or more regions of interest (ROIs). In some embodiments, the one or more detected objects 240 include one or more bounding boxes or other demarcation of at least one region in the image data 205 in which at least one object has been recognized (for which the detection and extraction network 215 has been trained to recognize). The specific pixels within the image data 205 containing each object may have not yet been isolated. As shown in visualization provided at FIG. 8A, one or more detected objects 240 may, in some embodiments, include or be associated with one or more bounding boxes defining the region(s) in the image data 205 containing the one or more detected instances of at least one trained object. In some cases, the feature maps 250 include feature maps of features detected at a plurality of patch sizes in each of the ROIs covered by the detected object(s) 240.

Referring to the illustrative example of FIG. 2, the image data 205 and the sparse depth map data 210 are also provided as inputs to a depth map densification network 230. According to some embodiments, the depth map densification network 230 includes a set of encoding and decoding network layers, which provide the inputs to an image-guided Gaussian filter from which higher-quality higher-density depth maps 260 (as expressed in terms of the number of depth points per area of image frame) of each ROI detected by the detection and extraction network 215. By confining feature mapping and densification of the sparse depth map data 210 to the identified ROIs (as opposed to performing a general feature mapping and densification of the depth map across the full area of the image data 205), some embodiments according to this disclosure avoid unnecessary processing loads and thus may be particularly suitable for use by battery-powered processing platforms or other processing platforms with limited power and processing bandwidths.

In preparation for segmentation by a convolutional network using a specified image patch size, an alignment operation 270 is performed to align the image data of the object ROI(s), feature map(s), and dense depth map(s) and to resize at least some of the object ROI(s), feature map(s), and dense depth map(s) to a common size scale. According to various embodiments, rescaling to align image data, feature maps, and dense depth maps may also be performed with an image-guided filter, similar to the image-guided filter used to perform depth map densification. At an operation 280, the aligned image data ROI(s), feature map(s), and depth map(s) from the region(s) of interest are passed to a fully convolutional network to obtain the segmentation results 299.

Although FIG. 2 illustrates one example of an architecture 200 for performing segmentation, various changes may be made to FIG. 2. For example, various components may be combined, further subdivided, replicated, omitted, or rearranged and additional components may be added according to particular needs.

Figure 3:
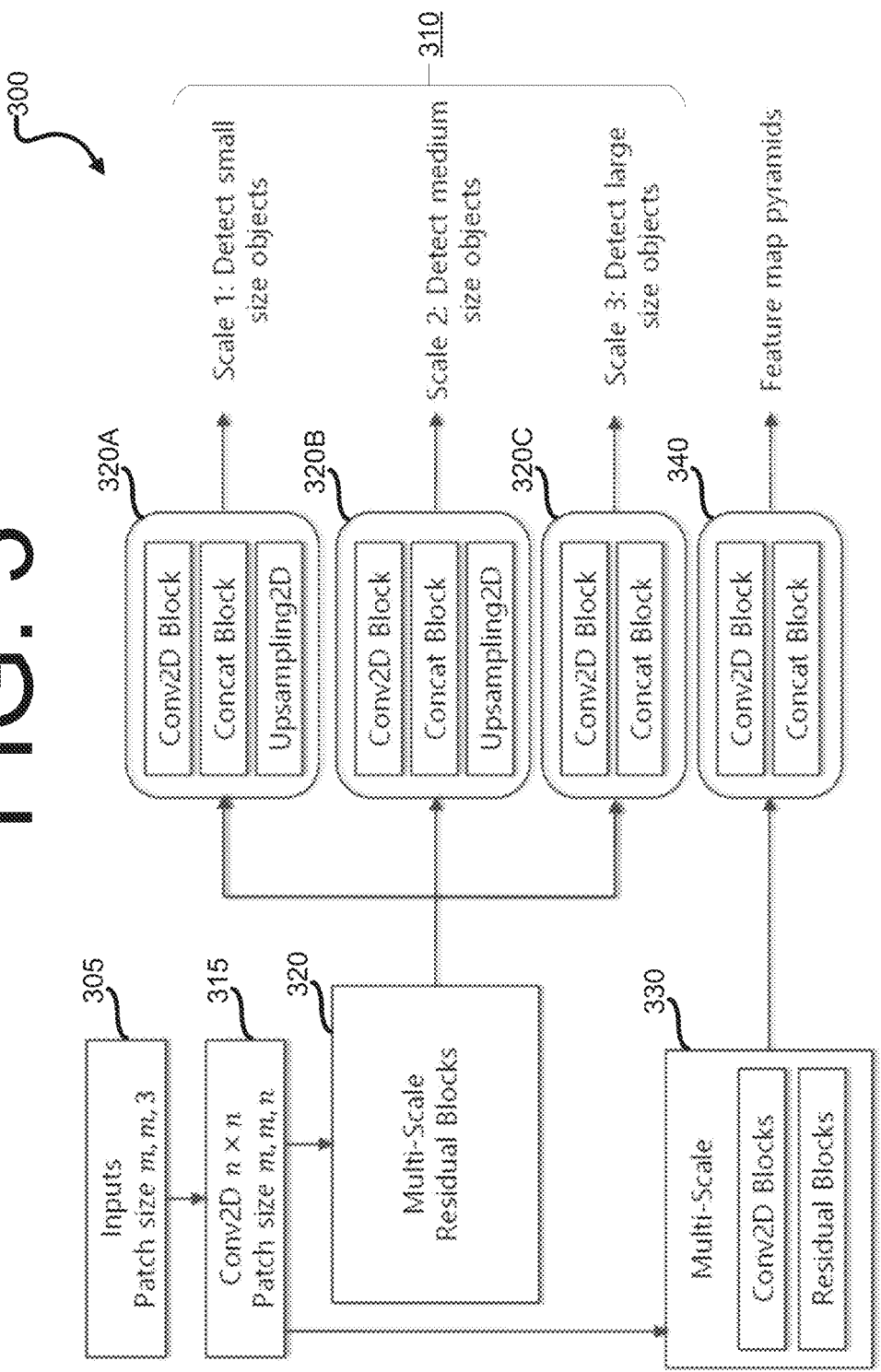
FIG. 3 illustrates an example of a neural network for performing object detection and feature extraction according to some embodiments of this disclosure.

FIG. 3 illustrates an example of a neural network 300 for performing object detection and feature extraction according to some embodiments of this disclosure. In some cases, the neural network 300 may be used to implement the detection and extraction network 215 in FIG. 2. According to various embodiments, the neural network 300 may be trained on a different processing platform than the processing platform used to perform object detection and feature detection based on image data (such as the image data 205 in FIG. 2) provided by one or more cameras of an apparatus.

Referring to the illustrative example of FIG. 3, at an operation 305, image data from the initially-obtained frame(s) of image data (such as the image data 205) is input into the neural network 300 as image patches of size m×m×x, where the height and width of the patches are of dimension m and where x represents the number of channels of the color space used to generate the image data (typically three or four channels are used). In some cases, m may be a user-definable integer.

Object detection 310 is performed by passing each of the input patches through a two-dimensional convolutional layer 315, which passes its outputs through a plurality of residual blocks 320 that perform object detection at a predefined number of object scales. In this illustrative example, the residual blocks 320 include three residual blocks configured to detect objects of interest at three size scales (such as small, medium, and large). Other embodiments with greater or fewer residual blocks are possible and within the scope of this disclosure. Here, a first residual block 320A is configured to detect small objects and includes a two-dimensional convolutional block, a concatenation block, and a two-dimensional upsampling block. The two-dimensional convolution block applies one or more filters scaled for objects of a first scale. A second residual block 320B is configured to detect medium-sized objects and utilizes the same architecture as the first residual block 320A, but the two-dimensional convolutional block applies one or more filters scaled for objects of a second scale (which is larger than the first scale). A third residual block 320C is configured to detect large-size objects and omits the two-dimensional upsampling block. In this example, when an image patch contains an object that the models of the residual blocks 320A-320C have been trained to recognize, the residual block detecting the object within the image patch outputs a coordinate range (such as a bounding box) defining a superset of pixels of image data that includes pixels of the identified object and a classification of the detected object. As noted previously, FIG. 8A of this disclosure provides an example visualization of object detection according to some embodiments of this disclosure.

As shown in FIG. 3, the neural network 300 further includes a plurality of feature detection blocks 330. The feature detection blocks 330, like the multi-scale residual blocks 320, are configured to perform image recognition operations using filters of varying kernel sizes applied across patches of image data. According to various embodiments, each of the feature detection blocks 330 includes a two-dimensional convolutional block and a plurality of residual blocks configured to extract features from patches of image data at different scales. The extracted features are further processed by a two-dimensional convolutional block and concatenation block 340 to obtain feature map pyramids. A feature map pyramid may include a plurality of feature maps associated with a single-scale image input, where the feature maps are proportionally sized to robustly capture features at multiple scales within the image input.

Although FIG. 3 illustrates one example of a neural network 300 for performing object detection and feature extraction, various changes may be made to FIG. 3. For example, various components may be combined, further subdivided, replicated, omitted, or rearranged and additional components may be added according to particular needs.

Figure 4:
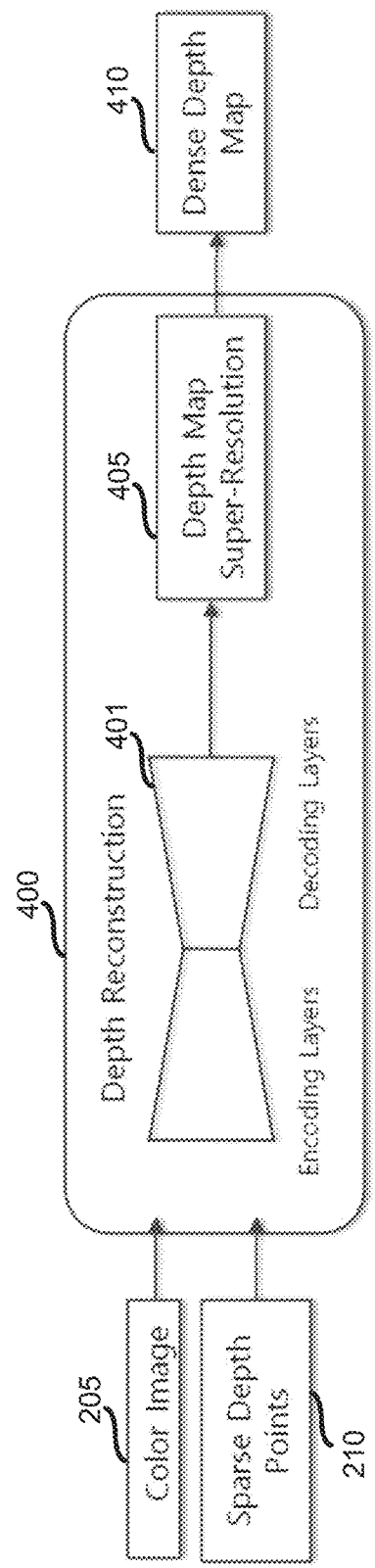
FIG. 4 illustrates an example of a processing pipeline for obtaining dense depth maps according to some embodiments of this disclosure.

FIG. 4 illustrates an example of a processing pipeline 400 for obtaining dense depth maps according to some embodiments of this disclosure. The operations described with reference to FIG. 4 may be performed at any suitably-configured processing platform, such as the device 100 in FIG. 1, and as part of the architecture(s) for performing segmentation (such as the architecture 200 in FIG. 2).

Referring to the illustrative example of FIG. 4, the processing pipeline 400 takes, as inputs, the image data 205 and the sparse depth map data 210. Here, this data may include image data and sparse depth points covering one or more ROIs identified by the detection and extraction network 215. According to various embodiments, the image data 205 and the sparse depth map data 210 are passed to a first neural network 401, which outputs a low-resolution depth map of predicted depth values for the scene. In some embodiments, the first neural network 401 includes two convolutional layers for encoding and four convolutional layers for decoding, although other embodiments using greater or fewer layers are possible and within the scope of this disclosure. Additionally, in some embodiments, the first neural network 401 may be a neural network utilizing a U-net architecture, which permits intermediate results that do not use the full depth of the network to be obtained. For some embodiments, such as where an application maintains a high frame rate or where multiple applications are executing simultaneously (causing processing time and/or system resources for scene segmentation to be limited), being able to access intermediate results from the U-net may save time and processing resources, thereby avoiding degradations in frame rate or performance of other applications.

Referring to the illustrative example of FIG. 4, the output of the first neural network (such as a depth map) is provided to an image-guided super-resolution stage 405, which refines and increases the data density of the depth map output by the first neural network 401 based at least in part on the image data 205. In contrast to interpolative approaches to recovering dense depth map data, the image-guided super-resolution stage 405 produces depth maps with fewer artifacts and that better represent edges and structural features of three-dimensional objects in the depth maps. From a performance standpoint, this may be advantageous on multiple levels. For example, where a dense depth map more closely tracks the dimensional contours of a real-world object, reprojections (such as reprojections to account for changes in pose at an AR or XR headset) of the real-world object may have cleaner, less ragged edges. As shown in FIG. 4, the processing pipeline 400 outputs one or more dense depth maps 410. In some embodiments, to conserve processing resources and time, only image data and sparse depth data from ROIs are passed through the processing pipeline 400, and the outputs of the pipeline 400 include a separate depth map 410 for each ROI.

Although FIG. 4 illustrates one example of a processing pipeline 400 for obtaining a dense depth map, various changes may be made to FIG. 4. For example, various components may be combined, further subdivided, replicated, omitted, or rearranged and additional components may be added according to particular needs.

Figure 5:
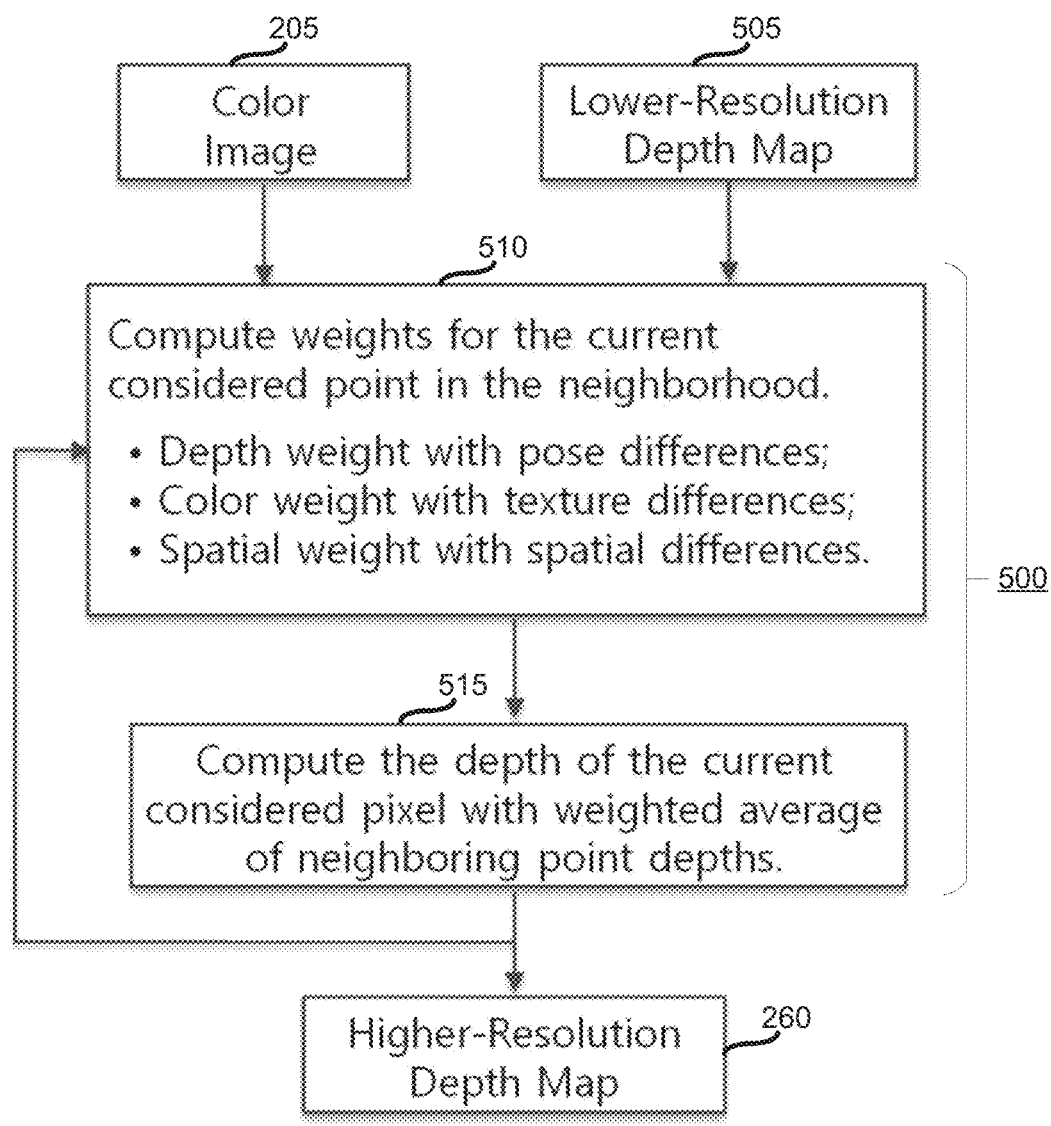
FIG. 5 illustrates operations of an example method for performing image-guided super-resolution of a sparse depth map according to some embodiments of this disclosure.

FIG. 5 illustrates operations of an example method 500 for performing image-guided super-resolution of a sparse depth map according to some embodiments of this disclosure. The method 500 may, for example, be implemented as part of a processing pipeline (such as the processing pipeline 400 in FIG. 4). The operations described with reference to FIG. 5 may be performed at any suitably configured processing platform, such as the device 100 in FIG. 1.

Referring to the illustrative example of FIG. 5, the method 500 takes, as inputs, the one or more frames of image data 205 and a low-resolution depth map 505. In some embodiments, the low-resolution depth map 505 may be output from a neural network trained to estimate depth values from sparse depth and image data (such as the first neural network 401 in FIG. 4). In other embodiments, the low-resolution depth map 505 may be obtained elsewhere. Using the image data 205 and low-resolution depth map 505, the method 500 outputs one or more dense depth maps 260 covering the one or more ROIs extracted by the detection and extraction network 215. In some embodiments, the operations of the method 500 correspond to those described in U.S. Patent Application Publication No. 2021/0358158, the contents of which are hereby incorporated by reference.

Referring to the illustrative example of FIG. 5, at an operation 510, the processing platform computes, for each existing point p of the sparse depth map, weightings of adjacent depth points in the neighborhood of the point p based on localized pose differences, color differences, and spatial differences. In this way, where the color, pose, and spatial data points indicate abrupt differences (such as a change in color indicating the boundary of an object against a background of a different color) in the neighborhood of the depth point p, the weighting values of adjacent points in the vicinity of the discontinuities in the color, pose, or spatial data are decreased. As such, by tuning the weights for averaging and propagating additional depth values across the sparse depth map to account for localized variations in color, pose, or spatial data which point to discontinuities or abrupt changes in depth, some embodiments according to this disclosure are able to generate depth maps that better hew to the three-dimensional contours of one or more real-world objects represented in the image and depth data.

According to various embodiments, at an operation 515, a depth value for each pixel or coordinate location of a dense depth map is computed based a function of a weighted average of depth values of neighboring depth points of the sparse depth map. According to some embodiments, computing the depths at the operation 515 includes passing a Gaussian filter over the low-resolution depth map 505 to determine the weighted average value depths for points of the high-resolution depth map 260. In embodiments in which the image data 205 and the low-resolution depth map 505 are provided for only the identified ROIs of a source image frame, the operations 510 and 515 may be looped and performed individually to obtain a separate high-resolution depth map 260 for each ROI.

Although FIG. 5 illustrates operations of one example of a method 500 for performing image-guided super-resolution of a sparse depth map, various changes may be made to FIG. 5. For example, while shown as a series of steps, various steps in FIG. 5 may overlap, occur in parallel, occur in a different order, or occur any number of times. Also, various steps may be omitted or replaced by other steps.

Figure 6:
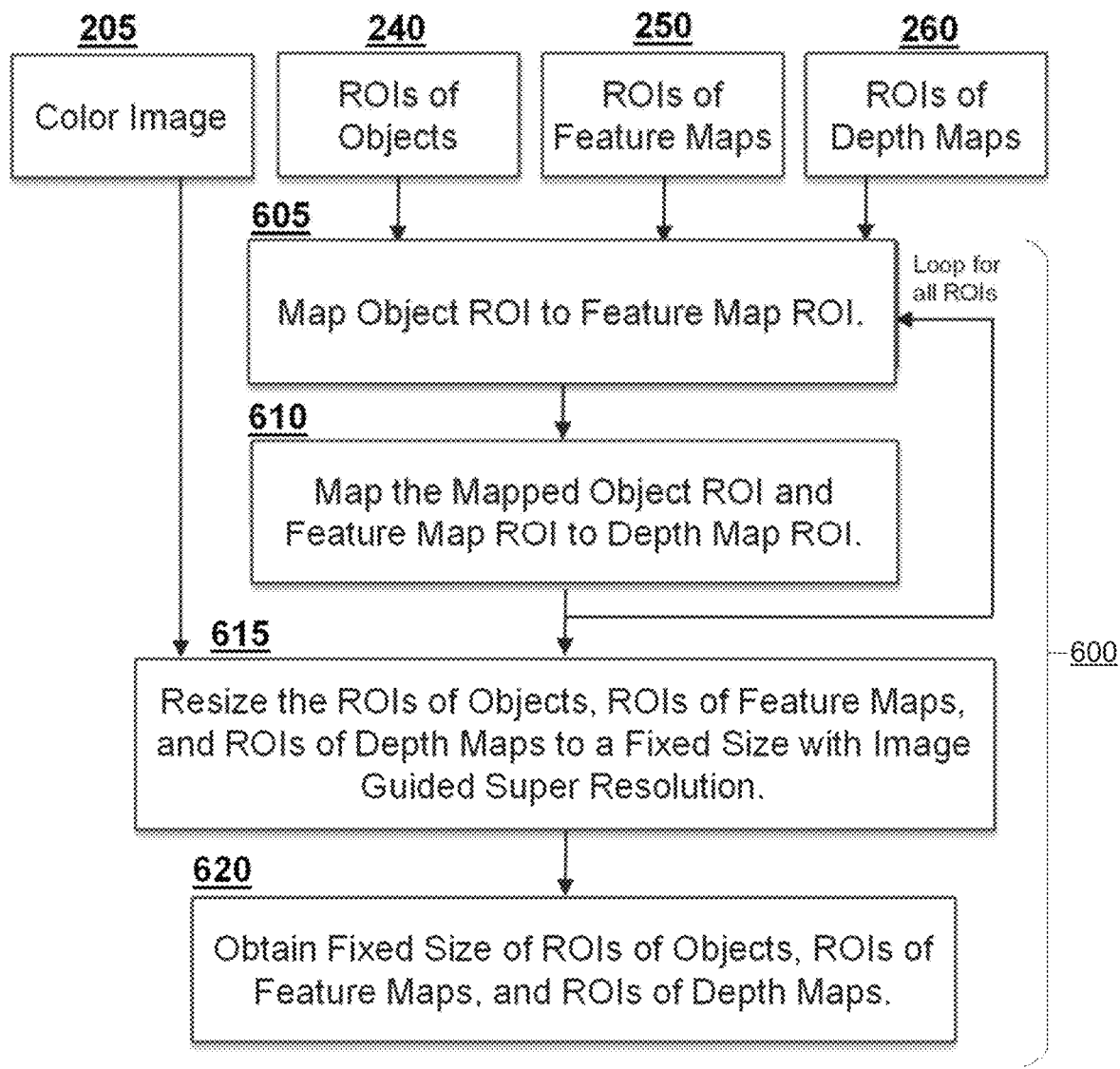
FIG. 6 illustrates operations of an example method for aligning object, feature map, and depth map regions of interest for segmentation according to some embodiments of this disclosure.

FIG. 6 illustrates operations of an example method 600 for aligning object, feature map, and depth map regions of interest for segmentation according to some embodiments of this disclosure. The method 600 may be performed as an element of an architecture (such as the architecture 200) for performing segmentation according to certain embodiments of this disclosure. The operations described with reference to FIG. 6 may be performed at any suitably configured processing platform, such as the device 100 in FIG. 1.

In contrast to neural networks used for object detection and feature extraction that are configured to operate with inputs across multiple size scales, convolutional neural networks used for segmentation may be configured to use a single input patch size, including an equivalent number of pixels per input patch. From an efficiency and performance standpoint, it is typically easier to resize the inputs for the segmentation network than to train a segmentation network to reliably identify dissimilarly-sized instances of the same object (such as a large set of pixels associated with a first person in the foreground of an image and a small collection of pixels associated with a second person in the background of the image).

Referring to the non-limiting example of FIG. 6, the method 600 takes, as inputs, the image data 205, coordinate values specifying the location(s) of the ROI(s) of one or more detected objects 240, the feature map 250 for each ROI, and the dense depth map 260 for each ROI. In the architecture 200, the detection and extraction network 215 outputs one or more detected objects 240 (such as one or more bounding boxes or other definitions of the space in the image data containing the detected objects) based on the outputs of a plurality of multi-scale residual blocks. Thus, ROIs for detected objects may be of different scales. Additionally, the depth map densification network 230 may output depth maps of different size(s) than the source data. Accordingly, there is no expectation or requirement that the ROI(s) of the detected object(s) 240 and the associated feature and dense depth maps will be of equal scale or include an equivalent number of pixels or data points.

Accordingly, at an operation 605, for a first ROI, the ROI for the detected object 240 is mapped to the corresponding ROI for the feature map 250. According to various embodiments, mapping in the context of the operation 605 may include determining a scaling factor for determining the size of the ROI for the detected object 240 relative to the size of the ROI for the feature map 250. At an operation 610, a further mapping of the ROI for the detected object 240 to the counterpart ROI for its dense depth map 260 is performed. At this point, for a given ROI, the relative scaling of the object ROI, feature map ROI and dense depth map ROI is known.

At an operation 615, for a given ROI, the object ROI, feature map ROI, and dense depth map ROI are resized to a common size, where the common size includes an equivalent array of points (such as m×n pixels or m×n depth points) of image, depth, or feature data. Where resizing a sparse ROI (such as one having comparatively fewer data points) requires upsampling, resizing may be performed using an image-guided super-resolution algorithm (such as the method 500 in FIG. 5) to increase the resolution of the ROI to the input patch size specified by the segmentation network. Similarly, where an ROI has a greater data density than the specified input patch size of the segmentation network, the ROI may be downsampled to match the patch size specified by the segmentation network. According to various embodiments, the operations 605-615 can be repeated as necessary until a set of equivalently-sized object, feature map, and dense depth map ROIs 620 for each ROI detected by the detection and extraction network 215 is produced.

Although FIG. 6 illustrates operations of one example of a method 600 for aligning ROIs, various changes may be made to FIG. 6. For example, while shown as a series of steps, various steps in FIG. 6 may overlap, occur in parallel, occur in a different order, or occur any number of times. Also, various steps may be omitted or replaced by other steps.

Figure 7:
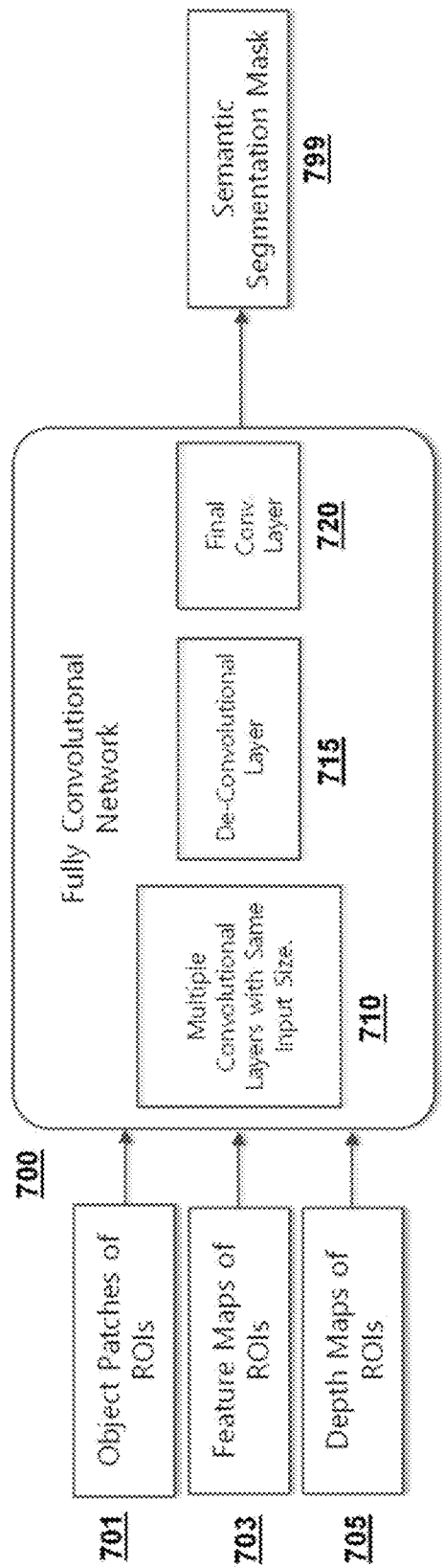
FIG. 7 illustrates an example of a fully convolutional network for performing segmentation according to some embodiments of this disclosure.

FIG. 7 illustrates an example of a fully convolutional network 700 for performing semantic segmentation according to some embodiments of this disclosure. The fully convolutional network 700 may be implemented at any suitably configured processing platform, such as the device 100 in FIG. 1. In some embodiments, the fully convolutional network 700 is trained on a separate processing platform than the platform at which the operations described with reference to FIG. 7 are performed.

Referring to the non-limiting example of FIG. 7, the fully convolutional network 700 takes, as inputs, aligned input patch data for a specific ROI that is identified by the detection and extraction network 215. According to some embodiments, the aligned input patch data includes image data 701 of the ROI, where the image data includes pixels of data from the ROI at the input patch size (such as m×n pixels) of the fully convolutional network 700. As shown in FIG. 7, the aligned input patch data also includes feature map data 703 of the same ROI as the image data 701. Note that the feature map data 703 may include one or more maps of the detected features in the ROI, such as constituent maps of a feature map pyramid, presented at the resolution specified by the input patch size of the fully convolutional network 700. In some embodiments, the aligned input patch data further includes depth map data 705, where the depth map data 705 includes depth points for a coordinate grid corresponding to the ROI covered by the image data 701 and the feature map data 703. The depth map data 705, like the image data 701 and the feature map data 703, is aligned and presented at a resolution and patch size specified by the fully convolutional network 700. According to various embodiments, the fully convolutional network 700 outputs one or more semantic segmentation masks 799.

Referring to the illustrative example of FIG. 7, the fully convolutional network 700 passes the aligned input patches (the image data 701, feature map data 703, and depth map data 705) through a plurality of convolutional layers 710 that use a common input size. The outputs of the convolutional layers 710 are passed to a single deconvolutional layer 715 that, in effect, reassembles the outputs of the convolutional layers 710 to be passed to a final convolutional layer 720. The convolutional layer 720 is used for pixel-wise prediction and outputs the semantic segmentation mask 799 for the ROI, where the semantic segmentation mask 799 identifies pixels of the ROI associated with a specific instance of a detected object. Passing aligned image, feature, and depth data for each ROI of a frame of image data through the fully convolutional network 700 results in a plurality of semantic segmentation masks (such as one for each ROI of the image frame), which are effectively an instance segmentation of the frame. As described with reference to FIG. 8C, these individual semantic segmentation masks may be fused or integrated to obtain a panoptic segmentation of the image frame.

Although FIG. 7 illustrates one example of a fully convolutional network 700 for performing semantic segmentation, various changes may be made to FIG. 7. For example, various components may be combined, further subdivided, replicated, omitted, or rearranged and additional components may be added according to particular needs.

Figure 8A:
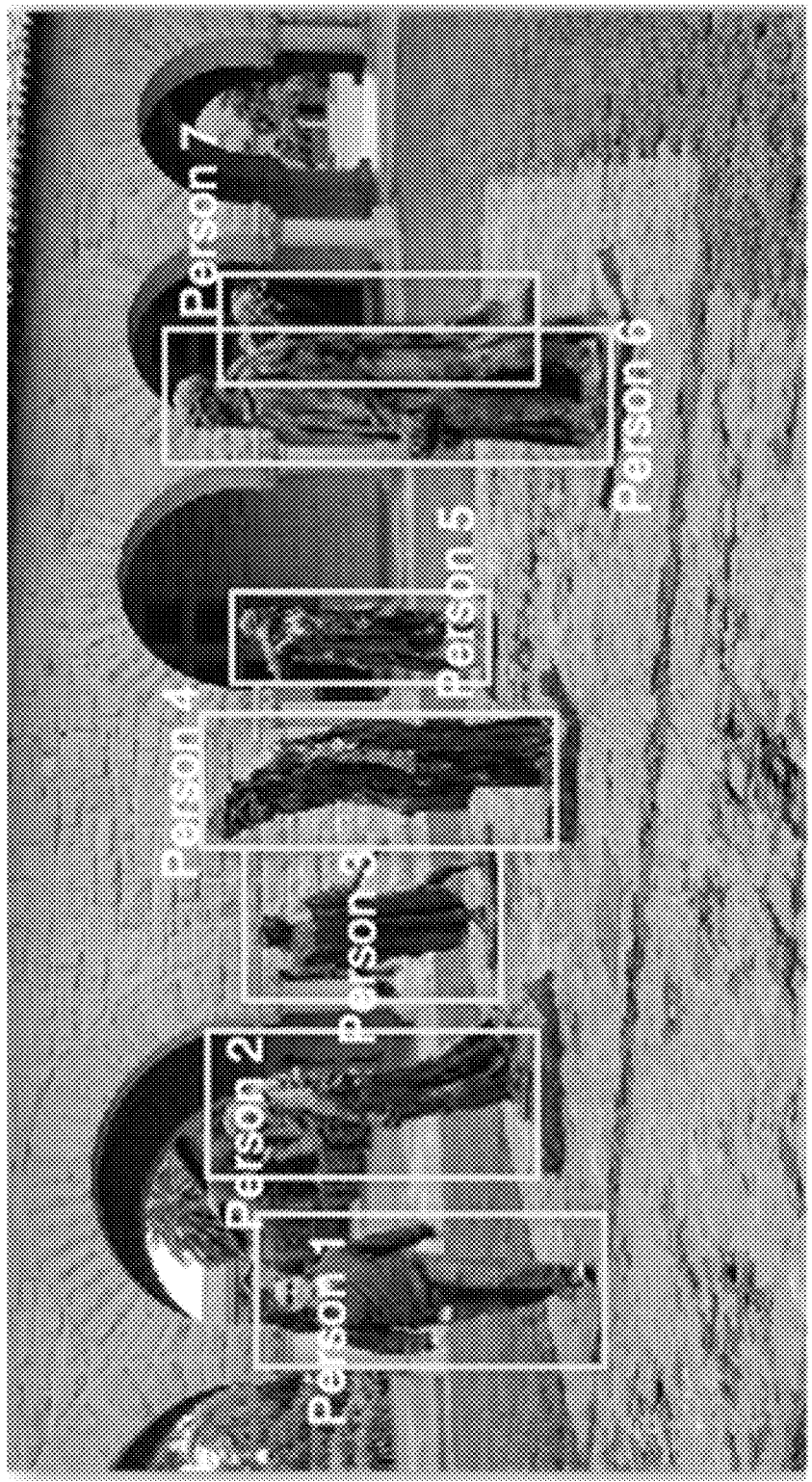
Figure 8B:
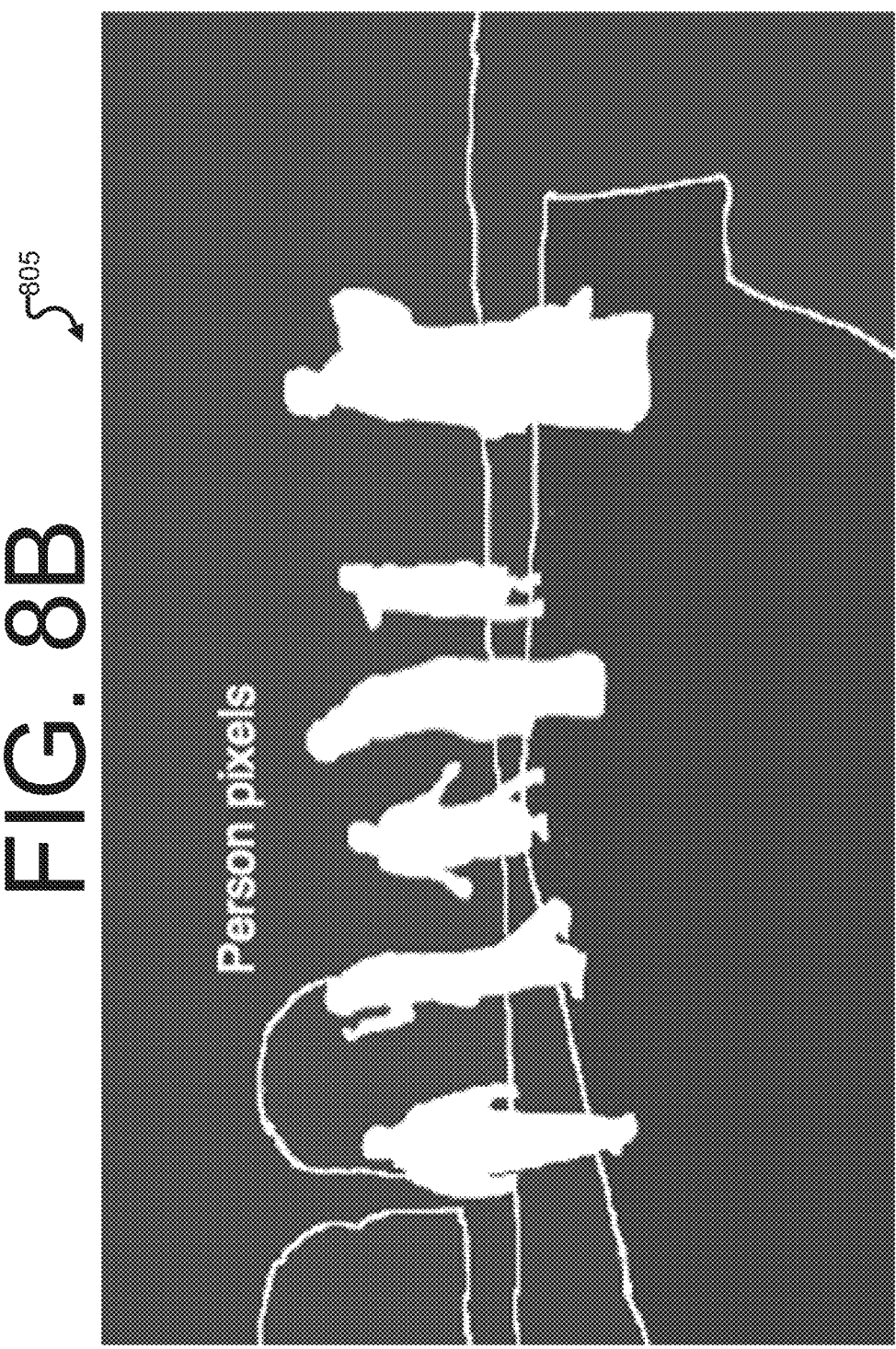

FIGS. 8A-8C illustrate examples of object detection and segmentation according to some embodiments of this disclosure. Referring to the illustrative example of FIG. 8A, a frame of image data 800 of a scene is shown. The scene includes a person and six sculptures having human forms. In the example of FIG. 8A, object detection and extraction of multiple regions of interest (ROIs) according to some embodiments of this disclosure have been performed. As shown in FIG. 8A, ROIs have been defined that correspond to objects for which the detection and extraction network 215 has been trained to recognize. In this example, the ROIs include boxes around the human forms labeled "Person 1" through "Person 7." In this example, while ROIs containing recognized objects have been found, the specific boundaries between the detected objects and the rest of the scene in the image data 800 have not yet been determined, nor have the boundaries between overlapping instances of the same object (such as the regions designated "Person 6" and "Person 7") been determined.

FIG. 8B provides an illustrative visualization of a semantic segmentation 805 of the frame of image data 800 from FIG. 8A. Referring to the illustrative example of FIG. 8B, each the constituent pixels of the image data 800 has been classified (such as by the fully convolutional network 700 in FIG. 7 or another a machine learning tool trained for semantic segmentation, like DeepLab) and shaded, colored, or otherwise marked according to their classifications in a semantic segmentation mask. In this example, pixels associated with human forms (labeled "person pixels" in the figure) have been colored white, while background components of the scene have been colored in shades of dark grey.

FIG. 8C provides an illustrative visualization of an instance segmentation 810 as applied to the semantic segmentation 805 in FIG. 8B. As described elsewhere in this disclosure, instance segmentation includes further subdividing a semantic segmentation to recognize the regions of pixels including individual instances of a recognized object. In this illustrative example, the pixels labeled as "person pixels" in FIG. 8B have been separately identified as instances of people and separately labeled "Person 1" through "Person 7." Additionally, an object boundary 815 between "Person 6" and "Person 7" has been determined from what was in FIG. 8B an undifferentiated region of pixels generally associated with image content recognized as having human forms.

Although FIGS. 8A-8C illustrate visual aspects of object detection, semantic segmentation, and instance segmentation, various changes may be made to FIGS. 8A-8C. For example, the contents of actual images that are obtained and processed can vary widely, and FIGS. 8A-8C do not limit this disclosure to any specific type of scene or image.

FIG. 9 illustrates operations of an example method 900 for performing segmentation according to some embodiments of this disclosure. The operations described with reference to FIG. 9 may be performed at any suitably configured processing platform, such as the device 100 in FIG. 1.

Referring to the non-limiting example of FIG. 9, at an operation 905, the processing platform obtains image data of a real-world scene (such as the image data 800 in FIG. 8) from one or more image sensors. As particular examples, the obtained image data may include one or more frames from a photosensor (such as a CMOS sensor) of a digital camera or an event stream from a capture interval from a dynamic vision sensor (DVS). At an operation 910, the processing platform obtains sparse image data of the real-world scene from a depth sensor whose field of view overlaps with at least part of the one or more image sensors used to obtain the image data. Examples of suitable depth sensors include, without limitation, time-of-flight (ToF) sensors, structured light sensors, and stereoscopic camera pairs. Sparse depth data may include depth data at a raw or native sensor resolution and which has not yet been upsampled or further processed to increase its resolution.

As shown in the illustrative example of FIG. 9, at an operation 915, the obtained image data is passed to a first neural network (such as the detection and extraction network 215) to obtain one or more object ROI and a feature map for the ROI. According to various embodiments, an object ROI includes a defined region of pixels in the image data containing pixels that the first neural network has recognized as representing one or more instances of an object and that the first neural network has been trained to recognize. According to various embodiments, the first neural network (such as the detection and extraction network 215) is a single network which performs both object detection and feature extraction.

According to some embodiments, at an operation 920, the image data and the sparse depth data are passed to a second neural network (such as the first neural network 401 in FIG. 4) to obtain one or more dense depth maps, where each dense depth map is associated with an ROI for which an object ROI and a feature map ROI were generated. In some embodiments, the operation 920 includes passing the image and sparse depth data to a neural network to obtain an initial set of predicted depth values and performing image-guided super resolution (such as by applying the method 500 of FIG. 5) to increase the resolution (densify) the sparse depth map.

At an operation 925, the object ROIs, feature map ROIs, and depth map ROIs are aligned and up- or down-scaled as necessary to create input patches of equal size (having the same number of data points) for a fully convolutional segmentation network. In some embodiments, where alignment requires increasing the resolution of one or more of an object, feature map, or depth map ROI, the same image-guided super-resolution techniques used to densify the one or more sparse depth maps at the operation 920 may be applied for upsampling the ROI.

At an operation 930, the aligned ROIs are passed to a fully convolutional network (such as the fully convolutional network 700 in FIG. 7) to obtain a segmentation of the scene. According to various embodiments, the obtained segmentation may include one or more semantic segmentations, where each semantic segmentation covers a single ROI within the image data. A panoptic segmentation of the image frame (such as is shown in FIG. 8C) may be obtained by integrating or fusing the individual semantic segmentations that are output by the fully convolutional network 700.

Although FIG. 9 illustrates operations of one example of a method 900 for performing segmentation, various changes may be made to FIG. 9. For example, while shown as a series of steps, various steps in FIG. 9 may overlap, occur in parallel, occur in a different order, or occur any number of times. Also, various steps may be omitted or replaced by other steps.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for obtaining scene segmentation, the method comprising:
    obtaining, from an image sensor, image data of a real-world scene;
    obtaining, from a depth sensor, sparse depth data of the real-world scene;
    passing the image data to a first neural network to obtain one or more object regions of interest (ROIs) and one or more feature map ROIs, wherein each object ROI comprises at least one detected object;
    passing the image data and the sparse depth data to a second neural network to obtain one or more dense depth map ROIs;
    aligning the one or more object ROIs, one or more feature map ROIs, and one or more dense depth map ROIs; and
    passing the aligned one or more object ROIs, one or more feature map ROIs, and one or more dense depth map ROIs to a fully convolutional network to obtain a segmentation of the real-world scene, wherein the segmentation contains one or more pixelwise predictions of one or more objects in the real-world scene;
    wherein aligning the one or more object ROIs, one or more feature map ROIs, and one or more dense depth map ROIs comprises resizing, using an image-guided filter, at least some of the one or more object ROIs, one or more feature map ROIs, and one or more dense depth map ROIs to a common size.

2. The method of claim 1, wherein the first neural network comprises:
    a first two-dimensional convolutional layer configured to receive the image data and output encoded image data;
    one or more multi-scale residual blocks each comprising one or more two-dimensional convolutional blocks and one or more concatenation blocks, each multi-scale residual block configured to receive the encoded image data and output one or more scale-dependent predictions of one or more detected objects in the image data; and
    a second two-dimensional convolutional layer configured to receive the encoded image data and output one or more feature map pyramids, the second two-dimensional convolutional layer comprising one or more second two-dimensional convolutional blocks and one or more second concatenation blocks.

3. The method of claim 1, wherein passing the image data and the sparse depth data to the second neural network comprises:
    passing the sparse depth data to a plurality of encoding and decoding layers to obtain one or more sparse depth maps; and
    passing the image data and the one or more sparse depth maps to an image-guided super-resolution stage to obtain the one or more dense depth map ROIs.

4. The method of claim 1, wherein aligning the one or more object ROIs, one or more feature map ROIs, and one or more dense depth map ROIs further comprises:
    for each of the one or more object ROIs, mapping the object ROI to a corresponding one of the one or more feature map ROIs and to a corresponding one of the one or more dense depth map ROIs.

5. The method of claim 1, wherein the segmentation of the real-world scene comprises a semantic segmentation mask.

6. The method of claim 5, further comprising:
    for each of the one or more object ROIs, obtaining an object classification of the at least one detected object in the object ROI; and
    combining the obtained object classification with the semantic segmentation mask to obtain an instance segmentation of the real-world scene.

7. The method of claim 1, wherein the method is performed using at least one processing device of a battery-powered portable device.

8. An apparatus for obtaining scene segmentation, the apparatus comprising:
    an image sensor;
    a depth sensor;
    at least one processing device configured to:
        obtain, from the image sensor, image data of a real-world scene;
        obtain, from the depth sensor, sparse depth data of the real-world scene;
        pass the image data to a first neural network to obtain one or more object regions of interest (ROIs) and one or more feature map ROIs, wherein each object ROI comprises at least one detected object;
        pass the image data and the sparse depth data to a second neural network to obtain one or more dense depth map ROIs;
        align the one or more object ROIs, one or more feature map ROIs, and one or more dense depth map ROIs; and
        pass the aligned one or more object ROIs, one or more feature map ROIs, and one or more dense depth map ROIs to a fully convolutional network to obtain a segmentation of the real-world scene, wherein the segmentation contains one or more pixelwise predictions of one or more objects in the real-world scene;
    wherein, to align the one or more object ROIs, one or more feature map ROIs, and one or more dense depth map ROIs, the at least one processing device is configured to resize, using an image guided filter, at least some of the one or more object ROIs, one or more feature map ROIs, and one or more dense depth map ROIs to a common size.

9. The apparatus of claim 8, wherein the first neural network comprises:
    a first two-dimensional convolutional layer configured to receive the image data and output encoded image data;
    one or more multi-scale residual blocks each comprising one or more two-dimensional convolutional blocks and one or more concatenation blocks, each multi-scale residual block configured to receive the encoded image data and output one or more scale-dependent predictions of one or more detected objects in the image data; and
    a second two-dimensional convolutional layer configured to receive the encoded image data and output one or more feature map pyramids, the second two-dimensional convolutional layer comprising one or more second two-dimensional convolutional blocks and one or more second concatenation blocks.

10. The apparatus of claim 8, wherein, to pass the image data and the sparse depth data to the second neural network, the at least one processing device is configured to:
pass the sparse depth data to a plurality of encoding and decoding layers to obtain one or more sparse depth maps; and
pass the image data and the one or more sparse depth maps to an image-guided super-resolution stage to obtain the one or more dense depth map ROIs.

11. The apparatus of claim 8, wherein, to align the one or more object ROIs, one or more feature map ROIs, and one or more dense depth map ROIs, the at least one processing device is further configured to:
for each of the one or more object ROIs, map the object ROI to a corresponding one of the one or more feature map ROIs and to a corresponding one of the one or more dense depth map ROIs.

12. The apparatus of claim 8, wherein the segmentation of the real-world scene comprises a semantic segmentation mask.

13. The apparatus of claim 12, wherein the at least one processing device is further configured to:
for each of the one or more object ROIs, obtain an object classification of the at least one detected object in the object ROI; and
combine the obtained object classification with the semantic segmentation mask to obtain an instance segmentation of the real-world scene.

14. The apparatus of claim 8, wherein the apparatus is a battery-powered portable device.

15. A non-transitory computer-readable medium containing instructions that, when executed by at least one processor of an apparatus comprising an image sensor and a depth sensor, cause the apparatus to:
obtain, from the image sensor, image data of a real-world scene;
obtain, from the depth sensor, sparse depth data of the real-world scene;
pass the image data to a first neural network to obtain one or more object regions of interest (ROIs) and one or more feature map ROIs, wherein each object ROI comprises at least one detected object;
pass the image data and the sparse depth data to a second neural network to obtain one or more dense depth map ROIs;
align the one or more object ROIs, one or more feature map ROIs, and one or more dense depth map ROIs; and
pass the aligned one or more object ROIs, one or more feature map ROIs, and one or more dense depth map ROIs to a fully convolutional network to obtain a segmentation of the real-world scene, wherein the segmentation contains one or more pixelwise predictions of one or more objects in the real-world scene;
wherein the instructions that when executed cause the apparatus to align the one or more object ROIs, one or more feature map ROIs, and one or more dense depth map ROIs comprise instructions that when executed cause the apparatus to resize, using an image guided filter, at least some of the one or more object ROIs, one or more feature map ROIs, and one or more dense depth map ROIs to a common size.

16. The non-transitory computer-readable medium of claim 15, wherein the first neural network comprises:
a first two-dimensional convolutional layer configured to receive the image data and output encoded image data;
one or more multi-scale residual blocks each comprising one or more two-dimensional convolutional blocks and one or more concatenation blocks, each multi-scale residual block configured to receive the encoded image data and output one or more scale-dependent predictions of one or more detected objects in the image data; and
a second two-dimensional convolutional layer configured to receive the encoded image data and output one or more feature map pyramids, the second two-dimensional convolutional layer comprising one or more second two-dimensional convolutional blocks and one or more second concatenation blocks.

17. The non-transitory computer-readable medium of claim 15, wherein the instructions that when executed cause the apparatus to pass the image data and the sparse depth data to the second neural network comprise instructions that when executed cause the apparatus to:
pass the sparse depth data to a plurality of encoding and decoding layers to obtain one or more sparse depth maps; and
pass the image data and the one or more sparse depth maps to an image-guided super-resolution stage to obtain the one or more dense depth map ROIs.

18. The non-transitory computer-readable medium of claim 15, wherein the instructions that when executed cause the apparatus to align the one or more object ROIs, one or more feature map ROIs, and one or more dense depth map ROIs further comprise instructions that when executed cause the apparatus to:
for each of the one or more object ROIs, map the object ROI to a corresponding one of the one or more feature map ROIs and to a corresponding one of the one or more dense depth map ROIs.

19. The non-transitory computer-readable medium of claim 15, wherein the segmentation of the real-world scene comprises a semantic segmentation mask.

20. The non-transitory computer-readable medium of claim 19, further containing instructions that when executed cause the apparatus to:
for each of the one or more object ROIs, obtain an object classification of the at least one detected object in the object ROI; and
combine the obtained object classification with the semantic segmentation mask to obtain an instance segmentation of the real-world scene.

* * * * *